(12) United States Patent
Salum (10) Patent No.: US 10,786,114 B2
(45) Date of Patent: Sep. 29, 2020

(54) BRAZZA GRILL

(71) Applicant: Jamil Salum, Chula Vista, CA (US)

(72) Inventor: Jamil Salum, Chula Vista, CA (US)

( * ) Notice: Subject to any disclaimer, the term of this patent is extended or adjusted under 35 U.S.C. 154(b) by 175 days.

(21) Appl. No.: 16/202,000

(22) Filed: Nov. 27, 2018

(65) Prior Publication Data

US 2019/0159630 A1 May 30, 2019

Related U.S. Application Data

(60) Provisional application No. 62/591,063, filed on Nov. 27, 2017.

(51) Int. Cl.
*A47J 37/07* (2006.01)

(52) U.S. Cl.
CPC ....... *A47J 37/0781* (2013.01); *A47J 37/0763* (2013.01); *A47J 37/0786* (2013.01); *A47J 2037/0795* (2013.01)

(58) Field of Classification Search
CPC ................ A47J 37/0781; A47J 37/0763; A47J 37/0786; A47J 2037/0795
See application file for complete search history.

(56) References Cited

U.S. PATENT DOCUMENTS

| | | | | |
|---|---|---|---|---|
| 3,491,744 A | * | 1/1970 | Von Kohorn, Jr. | .... A47B 31/02 126/25 R |
| 4,788,905 A | * | 12/1988 | Von Kohorn | ....... A47J 37/0781 126/25 R |
| 5,421,271 A | * | 6/1995 | Sui | ......... A47B 11/00 108/20 |
| 6,065,466 A | * | 5/2000 | Baykal | ................ A47J 37/0781 126/41 R |
| 9,131,802 B2 | * | 9/2015 | Rodriguez Aceves | ...................... A47J 37/0786 |
| 2005/0109331 A1 | * | 5/2005 | Chao | .................... A47J 37/0781 126/25 R |
| 2011/0162634 A1 | * | 7/2011 | Richard | .............. A47J 37/0781 126/25 R |
| 2014/0174427 A1 | * | 6/2014 | Yuen | ..................... A47J 37/067 126/25 R |
| 2014/0261379 A1 | * | 9/2014 | Mehler | ............... A47J 37/0694 126/25 R |
| 2015/0068512 A1 | * | 3/2015 | Mehler | ................. A47J 37/067 126/25 R |

* cited by examiner

*Primary Examiner* — Alfred Basichas
(74) *Attorney, Agent, or Firm* — Eric Hanscom (57) ABSTRACT

This invention is directed toward a rotating grill with adjustable grills that is both attractive and effective. The various grilling surfaces can be raised or lowered to allow for the different types of cooking that this device allows. A rotating base allows the user of the invention to rotate it, both for maximizing cooking and serving efficiency, and for entertainment of those waiting for food. A variety of side pieces and tables are available to provide more storage space for food and condiments/seasonings, and the base unit may, optionally, have space for internal storage.

19 Claims, 15 Drawing Sheets

BRAZZA GRILL

CROSS REFERENCE TO RELATED APPLICATIONS

This application claims priority back to U.S. Provisional No. 62/591,063, entitled "Brazza Grill", filed Nov. 27, 2017, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of outdoor grills, and more specifically to a multi-level grill that is both adjustable and rotatable.

The use of grills to cook meats, vegetables and other types of food is well known. However, many users of grills complain that when they want to sear the fish but gently broil the corn, they cannot do both simultaneously. Another problem with grills is that no matter how much a manufacturer dresses them up, most are still unattractive boxes that sit in an inconvenient place in the patio.

Thus there has existed a long-felt need for a grill that is both attractive and can allow for the grilling of a variety of items at different temperatures simultaneously.

The current invention provides just such a solution by providing a grill with several different levels at which items can be grilled. It is attractive and interesting for people awaiting their food. It is also circular, such that it provides viewing entertainment from 360 degrees, and also allows for one or more chefs to use a wider variety of grilling surfaces. The grill has a rotational feature that allows a user of the invention to rotate the grill around, thereby providing both uniform cooking and a better entertainment experience to the people in attendance at the grilling event.

Objects of the Invention

It is therefore a primary object of the present invention to provide a grill with several adjustable levels of grills, that can be rotated about an attractive table.

Additional objects of the invention include:
Providing a grill that rotates.
Providing a grill that allows for different levels of cooking
Providing a grill that allows for adjustment of the grills
Providing a grill that is attractive and fun for the people awaiting their food.
Providing a grill that allows for more than one chef to use the grill concurrently.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

REFERENCE NUMBERS USED

53. Donut grill
54. Grill
55. Charcoal tray
56. Small table
57. Large table
58. Grill body
59. Grill base
60. Small table support
61. Small table tubular support
62. Big table tubular support
63. Bearing
64. Handle
65. Small table top
66. Small table support bracket
67. Cavity
68. Small table top portion
69. Small table external strap
70. Small table internal strap
71. Small table basin
72. Angle support
73. Small table tubular support bracket
74. Small table connector plate
75. Connector support
76. Leveler plate
77. First tubular cross brace
78. Guide pin
79. Second tubular cross brace
80. Square leg 81. First grill side
82. First grill adjustable height arms
83. First grill base
84. Charcoal tray base
85. First grill body base
86. First grill tubular cross body
87. First grill support channel
88. First grill tubular 30 cross body
89. Insulating base
90. Lazy Susan circle
91. Upper grill disc
92. Upper grill support disc
93. Donut grill
94. Upper grill wire
95. Upper grill internal ring
96. Upper grill external ring
97. Removable handle arm
98. Hex nut.
99. Small table generally
100. Small table internal strap
101. Small table external strap
102. Small table angle support
103. Small table connector
104. Small table support

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Figure 1:
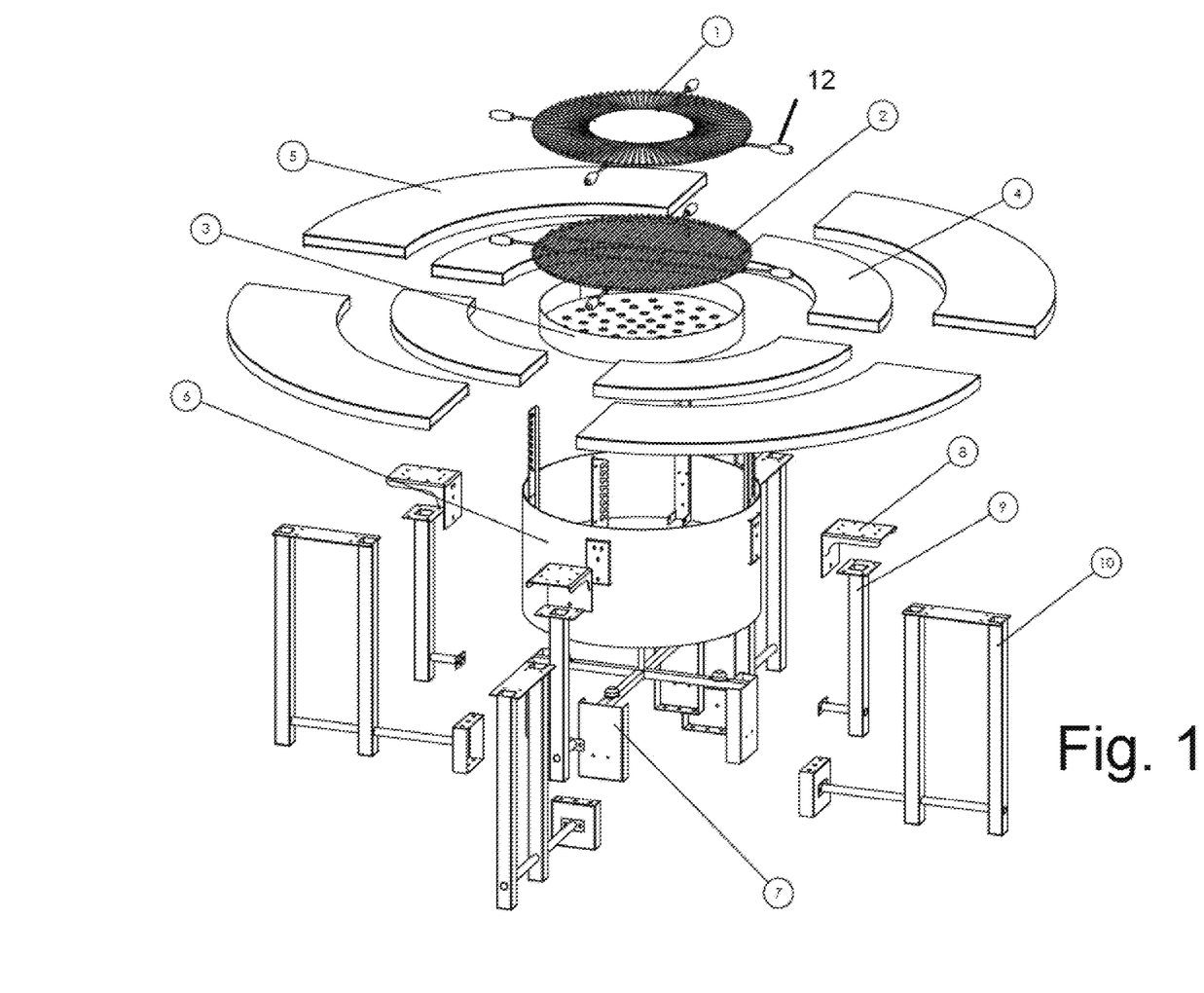
FIG. 1 is an exploded, perspective view of the invention, showing its various components before they are put together into the final product.

FIG. 1 is an exploded, perspective view of the invention, showing its various components before they are put together into the final product. A top grill or donut grill 1 rests on top of a grill 2. Handles 12, preferably of wood or some other non-heat conducting material allow for the easy removal of the grill. The grill has a grill body 6 and a grill base 7, and a charcoal tray 3 into which charcoal can be placed on burnt. The invention has a base which supports the grills, and one or more table sections that surround the grills, allowing cooks to place materials around the grill for cooking and/or to allow the food produced by the grill to be placed on the table sections. There are small table sections 4 and large table sections 5, where the small table nestles within the large table. There are Small table supports 8 and Small table tubular supports 9 which support the small table. Large table tubular supports 10 support the large table, and a Bearing 11 allows the grill to freely rotate on the base.

Figure 2:
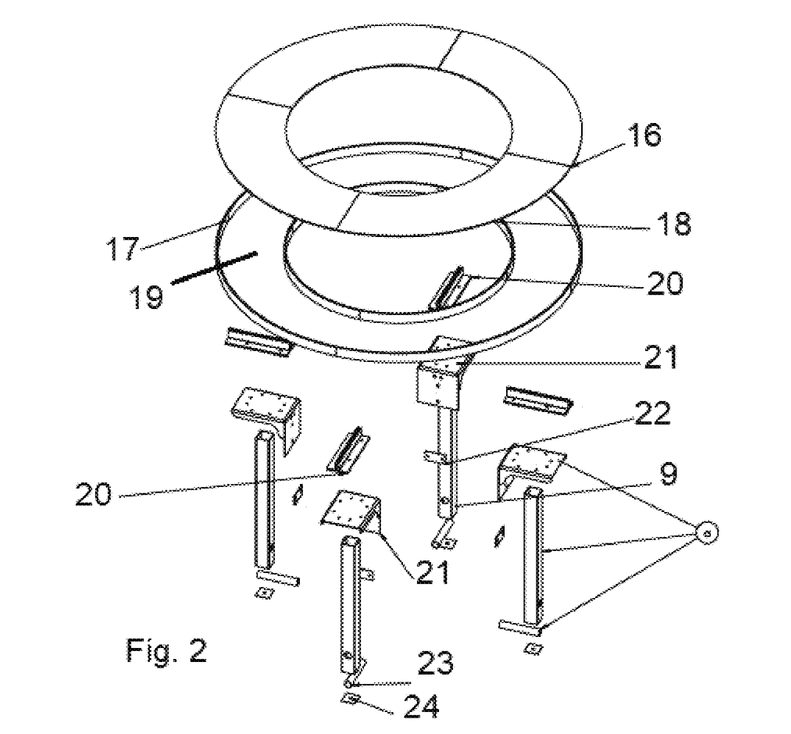
FIG. 2 is a top perspective view of the Grill Table part of the invention
Figure 3:
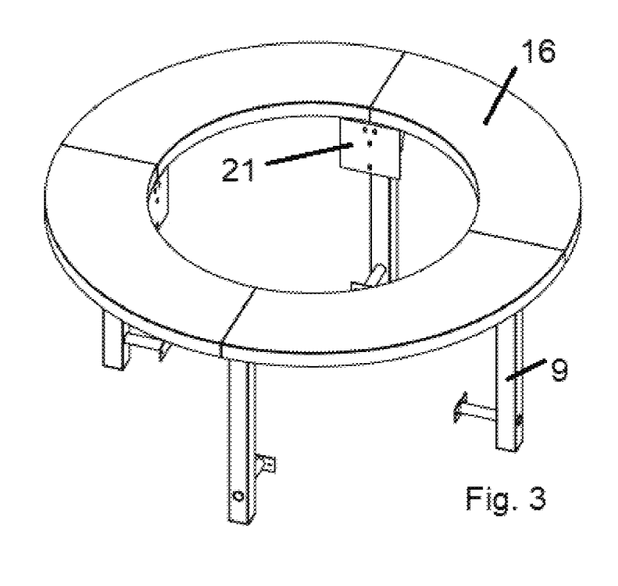
FIG. 3 is top perspective view of the Grill Table put together.

FIG. 2 is a top perspective view of the Grill Table part of the invention, and FIG. 3 is top perspective view of the Grill Table put together. There are four Small table top portions 16, which nestle into a small table basin 19, bounded by a small table external strap 17 and a small table internal strap 18. The four small table top portions form a cavity 15, into which the first grill fits. Several angle supports 20 support the bottom of the small table, and are reinforced by small table tubular support brackets 21, small table connector plates 22, and connector supports 23. Leveler plates 24 at the bottom allow for adjustment of the height of each leg.

Figure 4:
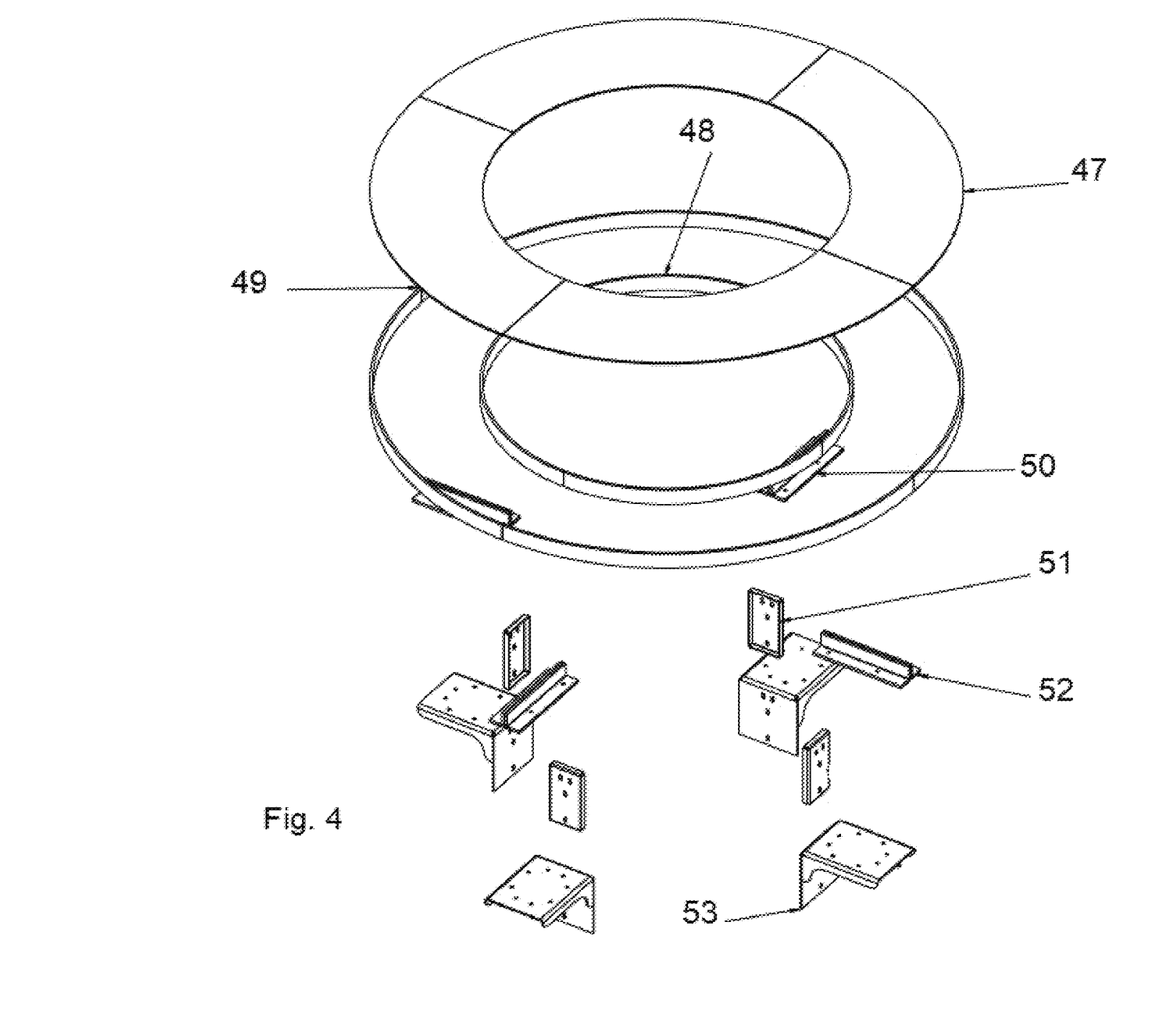
FIG. 4 is a top, perspective view of a "small table" base part of the invention.
Figure 5:
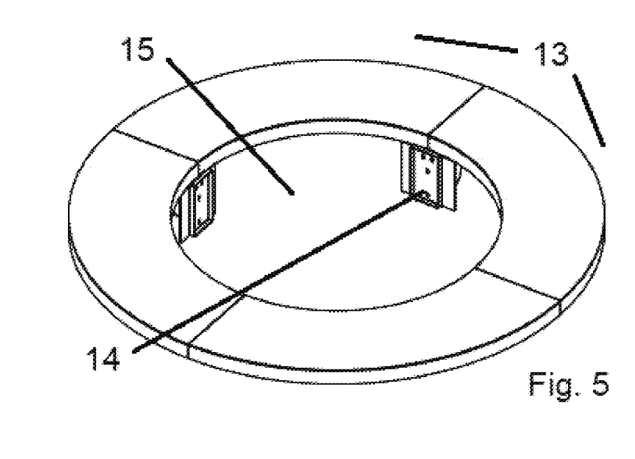
FIG. 5 is a top, perspective view of a "small table" base part of the invention in its assembled form.

FIG. 4 is a top, perspective view of a "small table" base part of the invention, and FIG. 5 is a top, perspective view of a "small table" base part of the invention in its assembled form. The small table top, referred to generally as 13, creates a cavity 15, and is supported by small table support brackets 14. The small table top 47 fits into a basin bounded by small table external strap 49 and small table internal strap 48. Small table angle support 50 connects the small table to its supports, namely, several small table connectors 51 and several small table supports 52.

Figure 6:
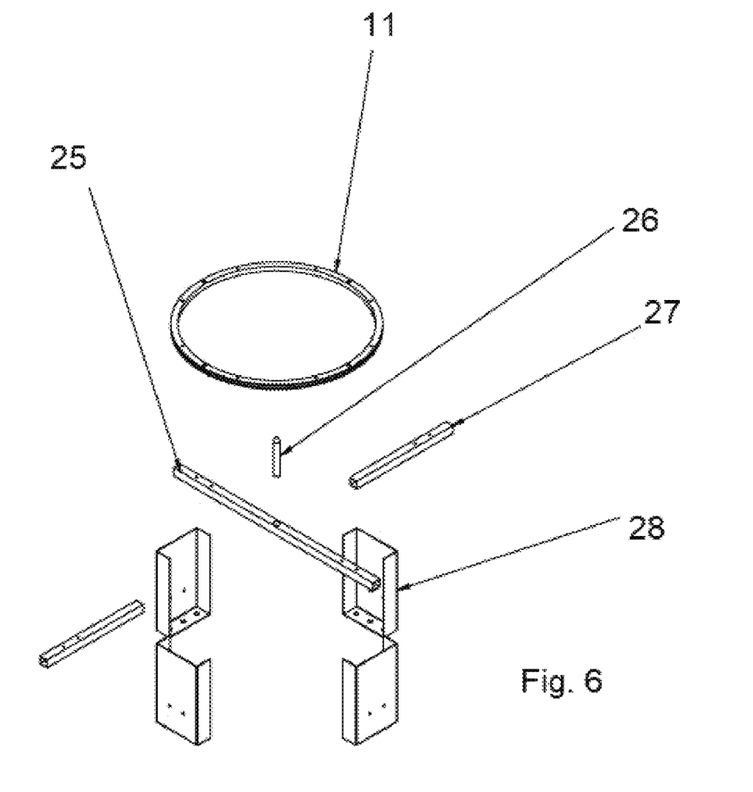
FIG. 6 is a perspective view rotating ring component.
Figure 7:
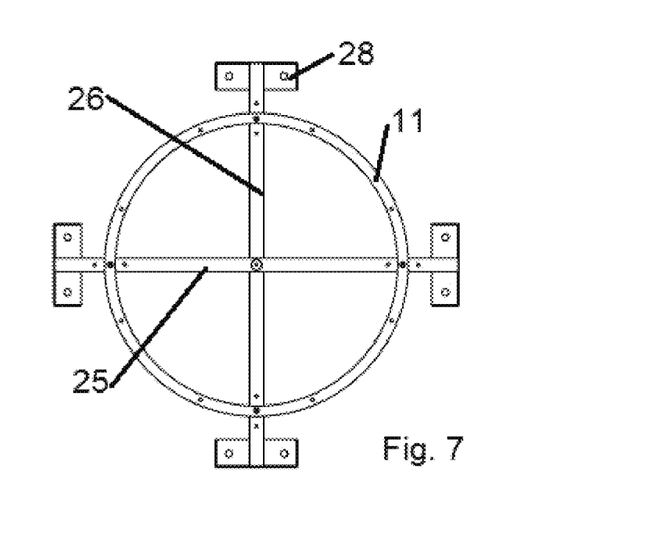
FIG. 7 is top view of the rotating ring.
Figure 8:
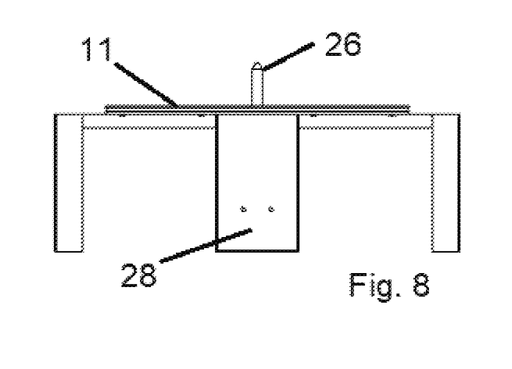
FIG. 8 side view of the rotating ring.

FIG. 6 is a perspective view rotating ring component, FIG. 7 is top view of the rotating ring, and, FIG. 8 side view of the rotating ring. The bearing 11 is the key to the rotational abilities of the invention. The bearing 11 sits on a first tubular cross brace 25 the intersects at 90-degree angles with two second tubular cross braces 27. A guide pin 26 extends from the center of the first tubular cross brace 25. Several square legs 28 provide support for the rotating ring.

Figure 9:
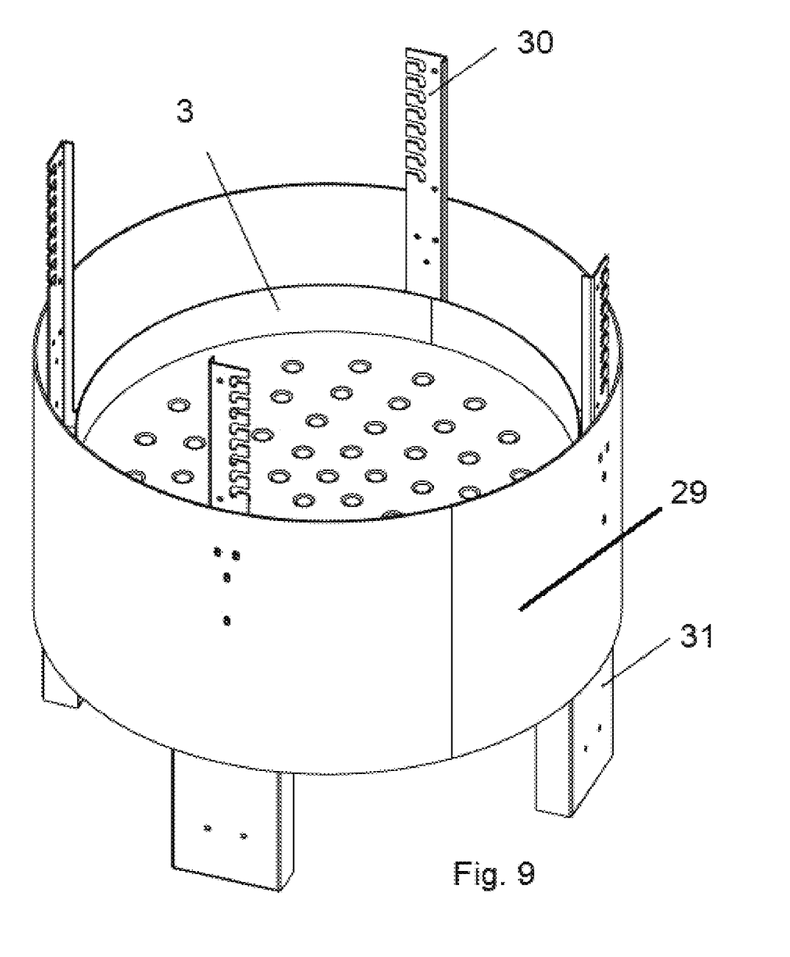
FIG. 9 is a top, perspective view of the first grill portion of this invention.
Figure 10:
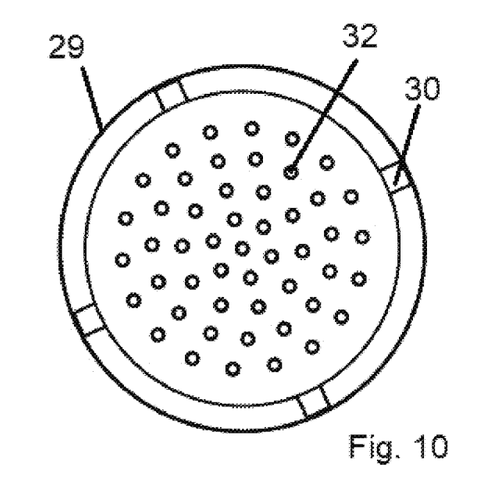
FIG. 10 top view of the first grill.
Figure 11:
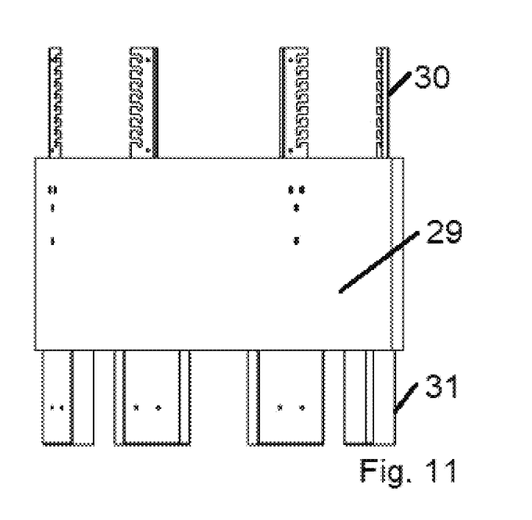
FIG. 11 is a side view of the first grill.
Figure 12:
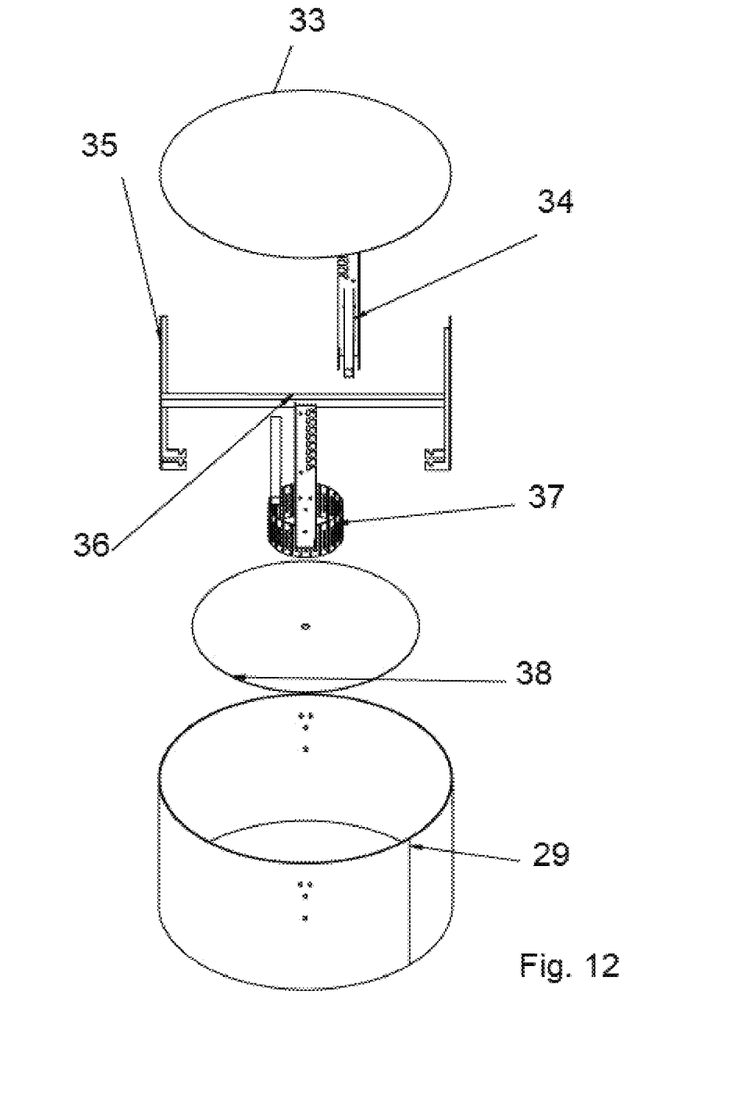
FIG. 12 is an exploded view of the first grill.
Figure 13:
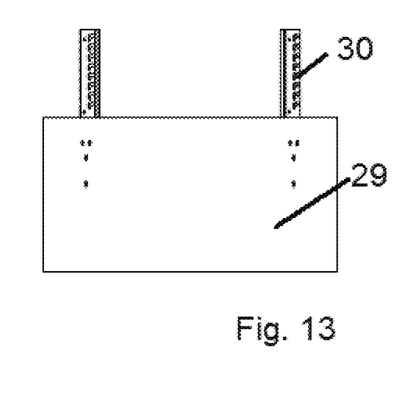
FIG. 13 is top view of the first grill.
Figure 14:
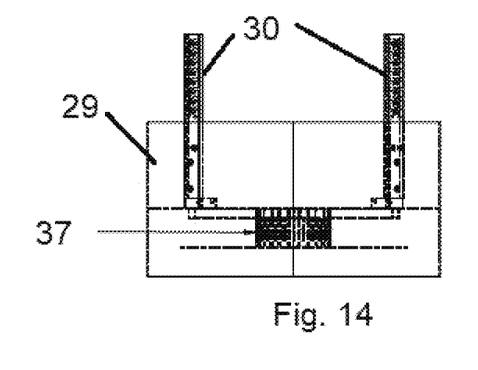
FIG. 14 is a cross-sectional view of the first grill.

FIG. 9 is a top, perspective view of the first grill portion of this invention, FIG. 10 top view of the first grill, FIG. 11 is a side view of the first grill, FIG. 12 is an exploded view of the first grill, FIG. 13 is top view of the first grill, and, FIG. 14 is a cross-sectional view of the first grill. The charcoal tray 3 sits within the first grill. The first grill has a first grill side 29, a first grill base 31, and four, in this embodiment, first grill adjustable height arms 30, upon which the upper grills are placed at desired heights. The first grill is comprised of first grill sides 29, in this case a cylinder, into which the charcoal tray 3 sits, with charcoal burning on the charcoal tray base 32. Inserted into the first grill is a Lazy Susan circle 38, and an insulating base 37 from which a first grill tubular 30 cross body 36 extends, culminating in a first grill support channel 35. A first grills tubular cross body 34 extends from a first grill body base 33. The first grill adjustable height arms 30, allow the user to adjust the height of the second grill.

Figure 15:
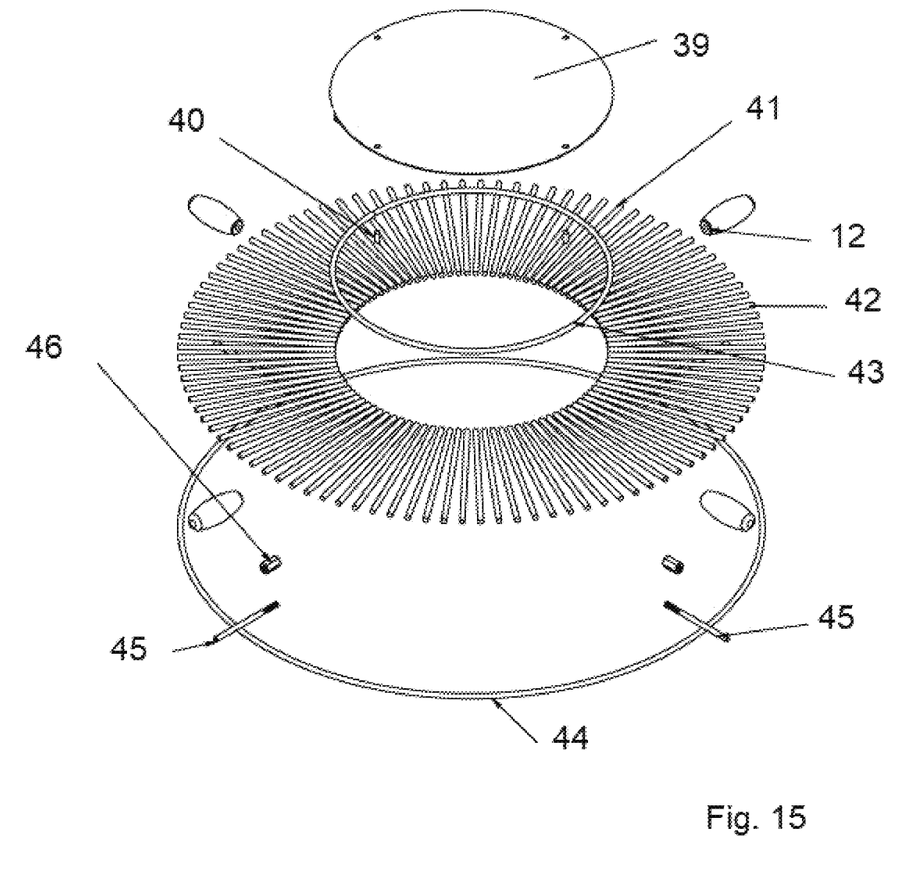
FIG. 15 is a top, perspective view of the second grill.

FIG. 15 is a top, perspective view of the second grill. The second grill can be inserted into slots in the first grill adjustable height arms 30. At the top of the second grill is an upper grill disc 39 that rests on an upper grill support disc 40. A donut grill 41 with an upper grill wire 42, an upper grill internal ring 43 and an upper grill external ring 44 can be adjusted safely through the use of handles 12. A removable handle arm 45 can be attached and detached through a hex nut 46. Note that a preferred embodiment of the invention has two second grills to allow for cooking at two different elevations.

The invention works as follows. The table serves as the base and support for the rest of the invention. Above the table, the bearing allows a Brazza grill to rotate around. Above the first grill is the second grill. The theory behind the invention is to allow a user of the invention to grill a variety of foods under a variety of different degrees of heat, separation from the source of heat, and exposure, all the while providing entertainment to the people waiting for the finished food.

The table has a table top and a table bottom. Attached to the table bottom are four sets of table legs. Each set of table legs comprises one or more upright members joined by a connector. The sets of table legs are attached to the table bottom by table brackets. In the center of the grill table is a table cavity, into which the other parts of the invention rest.

Above the table but below the first grill is a rotating base, which supports a bearing upon which the bottom of the first grill rotates. The first grill itself is a cylinder into which a charcoal tray is placed that holds the hot charcoal. Extending upward from the sides of the first grill are four "racks" which slots into which the second grill can be placed to adjust its height above the charcoal tray.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A grill, comprising a support structure, a rotator, a first grill, one additional grill, where, the support structure comprises an inner table,
   where the inner table additionally comprises a cavity, where the rotator rests on the support structure, where the first grill rests on the rotator, and where the upper second grill is inserted into a first slot of the slots in each of the first grill adjustable height arms and the lower second grill is inserted into a second slot of the slots in each of the first grill adjustable height arms.

2. The grill of claim 1, where the first grill comprises a first grill side, four first grill adjustable height arms, where each of the four first grill adjustable height arms have a plurality of slots, a first grill base, a first grill body base, a charcoal tray base, an insulating base, a Lazy Susan circle, one or more first grill tubular cross bodies, one or more first grill support channels, one or more first grill tubular cross bodies, and a charcoal tray.

3. The grill of claim 1, where the charcoal tray comprises a tray base and a tray side, and comprises a plurality holes in the tray base.

4. The grill of claim 1, additionally comprising an outer table where the outer table comprises four outer table top sections, an outer table basin and a plurality of outer table tubular supports.

5. The grill of claim 1, where the inner table comprises an inner table top, a plurality of inner table support brackets, a cavity, four inner table top portions, an inner table external strap, an inner table internal strap, an inner table basin, a plurality of angle supports, a plurality of inner table tubular support brackets, a plurality of connector supports, and a plurality of leveler plates, where the four inner table top portions nestle within the inner table basin.

6. The grill of claim 1, where the rotator is a rotating ring comprises a bearing, a guide pin, a first tubular cross brace, two second tubular cross braces, four square legs, where, the bearing rests on an intersection between the a first tubular cross brace, two second tubular cross braces, one of each of the four square legs is connected to the two second tubular cross braces, two of the four square legs are connected to a front and a back of the first tubular cross brace, and the guide pin projects at a 90 degree angle upright from the intersection between the first tubular cross brace and the two second tubular cross braces.

7. The grill of claim 1, where the rotator is a Lazy Susan.

8. The grill of claim 1, where the rotator is an aluminum bearing.

9. The grill of claim 1, where the second grill comprises, a donut grill, an upper grill disc, an upper grill support disc, an upper grill wire, an upper grill internal ring, an upper grill external ring, one or more removable handle arms, one or more handles, and one or more hex nuts, where the one or more handles are made from wood.

10. The grill of claim 1, where the support structure additionally comprises a storage space.

11. The grill of claim 1, additionally comprising a second additional grill, where the two additional grills comprise an upper second grill and a lower second grill.

12. A grill, comprising a support structure, a rotating ring, a first grill, and an additional grill, where, the support structure comprises an outer table and an inner table, where the outer table comprises outer large table top sections, an outer table basin and a plurality of outer table tubular supports, and, where the inner table comprises an inner table top, a plurality of inner table support brackets, a cavity, four inner table top portions, an inner table external strap, an inner table internal strap, an inner table basin, a plurality of angle supports, a plurality of inner table tubular support brackets, a plurality of connector supports, and a plurality of leveler plates, where the four inner table top portions nestle within the inner table basin.

13. The grill of claim 12, where the rotating ring comprises a bearing, a guide pin, a first tubular cross brace, two second tubular cross braces, four square legs, where, the bearing rests on an intersection between the a first tubular cross brace, two second tubular cross braces, one of each of the four square legs is connected to the two second tubular cross braces, two of the four square legs are connected to a front and a back of the first tubular cross brace, and the guide pin projects at a 90 degree angle upright from the intersection between the first tubular cross brace and the two second tubular cross braces.

14. The grill of claim 13, where the first grill comprises a first grill side, four first grill adjustable height arms, where each of the four first grill adjustable height arms have a plurality of slots, a first grill base, a first grill body base, a charcoal tray base, an insulating base, a Lazy Susan circle, one or more first grill tubular cross bodies, one or more first grill support channels, one or more first grill tubular [30] cross bodies, and a charcoal tray.

15. The grill of claim 14, where the second grill comprises, a donut grill, an upper grill disc, an upper grill support disc, an upper grill wire, an upper grill internal ring, an upper grill external ring, one or more removable handle arms, one or more handles, and one or more hex nuts, where the one or more handles are made from wood.

16. The grill of claim 15, where the inner table additionally comprises a cavity, where the rotating ring rests on the support structure, where the first grill rests on the rotating ring, and where the upper second grill is inserted into a first slot of the slots in each of the first grill adjustable height arms and the lower second grill is inserted into a second slot of the slots in each of the first grill adjustable height arms.

17. The grill of claim 12, where the outer table comprises four outer table top sections, an outer table basin and a plurality of outer table tubular supports, and, where the inner table comprises an inner table top, a plurality of inner table support brackets, a cavity, four inner table top portions, an inner table external strap, an inner table internal strap, an inner table basin, a plurality of angle supports, a plurality of inner table tubular support brackets, a plurality of connector supports, and a plurality of leveler plates, where the four inner table top portions nestle within the inner table basin, and where the first grill comprises a first grill side, four first grill adjustable height arms, where each of the four first grill adjustable height arms have a plurality of slots, a first grill base, a first grill body base, a charcoal tray base, an insulating base, a Lazy Susan circle, one or more first grill tubular cross bodies, one or more first grill support channels, one or more first grill tubular cross bodies, and a charcoal tray.

18. The grill of claim 12, where the second grill comprises, a donut grill, an upper grill disc, an upper grill support disc, an upper grill wire, an upper grill internal ring, an upper grill external ring, one or more removable handle arms, one or more handles, and one or more hex nuts, where the one or more handles are made from wood, where the rotating ring comprises a bearing, a guide pin, a first tubular cross brace, two second tubular cross braces, four square legs, where, the bearing rests on an intersection between the a first tubular cross brace, two second tubular cross braces, one of each of the four square legs is connected to the two second tubular cross braces, two of the four square legs are connected to a front and a back of the first tubular cross brace, and the guide pin projects at a 90 degree angle upright from the intersection between the first tubular cross brace and the two second tubular cross braces, and, where the inner table additionally comprises a cavity, where the rotating ring rests on the support structure, where the first grill rests on the rotating ring, and where the upper second grill is inserted into a first slot of the slots in each of the first grill adjustable height arms and the lower second grill is inserted into a second slot of the slots in each of the first grill adjustable height arms.

19. A grill, consisting of a support structure, a rotating ring, a first grill, and two second grills, an upper second grill and a lower second grill, where, the support structure consists of an outer table and an inner table,
   where the outer table comprises four outer table top sections, a outer table basin and a plurality of outer table tubular supports,
   where the inner table comprises an inner table top, a plurality of inner table support brackets, a cavity, four inner table top portions, an inner table external strap, an inner table internal strap, an inner table basin, a plurality of angle supports, a plurality of inner table tubular support brackets, a plurality of connector supports, and a plurality of leveler plates, where the four inner table top portions nestle within the inner table basin, where the rotating ring comprises a bearing, a guide pin, a first tubular cross brace, two second tubular cross braces, four square legs, where, the bearing rests on an intersection between the a first tubular cross brace, two second tubular cross braces, one of each of the four square legs is connected to the two second tubular cross braces, two of the four square legs are connected to a front and a back of the first tubular cross brace, and the guide pin projects at a 90 degree angle upright from the intersection between the first tubular cross brace and the two second tubular cross braces,
   where the first grill comprises a first grill side, four first grill adjustable height arms, where each of the four first grill adjustable height arms have a plurality of slots, a first grill base, a first grill body base, a charcoal tray base, an insulating base, a Lazy Susan circle, one or more first grill tubular cross bodies, one or more first grill support channels, one or more first grill tubular cross bodies, and a charcoal tray,
   where the second grill comprises, a donut grill, an upper grill disc, an upper grill support disc, an upper grill wire, an upper grill internal ring, an upper grill external ring, one or more removable handle arms, one or more handles, and one or more hex nuts, where the one or more handles are made from wood,
   where the inner table additionally comprises a cavity, where the rotating ring rests on the support structure, where the first grill rests on the rotating ring, and where the upper second grill is inserted into a first slot of the slots in each of the first grill adjustable height arms and the lower second grill is inserted into a second slot of the slots in each of the first grill adjustable height arms.

\* \* \* \* \*